(12) United States Patent
Rota (10) Patent No.: US 9,693,608 B1
(45) Date of Patent: Jul. 4, 2017

(54) LINK ADJUSTMENT MECHANISM

(71) Applicant: Fossil Group, Inc., Richardson, TX (US)

(72) Inventor: Flavio Rota, Evilard (CH)

(73) Assignee: Fossil Group, Inc., Richardson, TX (US)

( * ) Notice: Subject to any disclaimer, the term of this patent is extended or adjusted under 35 U.S.C. 154(b) by 0 days.

(21) Appl. No.: 15/372,105

(22) Filed: Dec. 7, 2016

(51) Int. Cl.
| F16G 15/04 | (2006.01) |
| A44C 5/02 | (2006.01) |
| A44C 5/00 | (2006.01) |
| G04B 37/16 | (2006.01) |

(52) U.S. Cl.
CPC ............... *A44C 5/027* (2013.01); *A44C 5/00* (2013.01); *A44C 5/02* (2013.01); *F16G 15/04* (2013.01); *G04B 37/16* (2013.01)

(58) Field of Classification Search
CPC .......... A44C 5/027; A44C 5/0076; A44C 5/02
USPC ............................................................ 59/80
See application file for complete search history.

(56) References Cited

U.S. PATENT DOCUMENTS

| 906,563 | A | | 12/1908 | Ryan | |
| 5,038,557 | A | * | 8/1991 | Otsuki | A44C 5/107 59/80 |
| 5,483,505 | A | * | 1/1996 | Cartier | G04B 37/1493 224/164 |
| 6,014,793 | A | * | 1/2000 | Howald | A44C 5/147 24/115 G |
| 6,237,319 | B1 | * | 5/2001 | Amundsen | A44C 5/105 59/80 |
| 6,272,836 | B1 | * | 8/2001 | Fat | A44C 5/107 59/80 |
| 7,946,103 | B2 | * | 5/2011 | So | A44C 5/102 24/265 B |
| 9,066,563 | B2 | * | 6/2015 | Chan | G04B 37/16 |

FOREIGN PATENT DOCUMENTS

| CH | 622414 | | 4/1981 |
| CH | 699067 | A1 | 1/2010 |
| DE | 1926106 | A1 | 11/1970 |
| EP | 0366806 | A1 | 5/1990 |
| EP | 0797132 | A1 | 9/1997 |
| FR | 2151595 | A5 | 4/1973 |
| GB | 2338170 | A | 12/1999 |

* cited by examiner

*Primary Examiner* — David B Jones
(74) *Attorney, Agent, or Firm* — Kirby B. Drake; Klemchuk LLP (57) ABSTRACT

A band may include a plurality of interlocking links or link adjustment mechanisms. An interlocking link or link adjustment mechanism may include a rotating member on a first side, and a static member on a second side. The rotating member may rotate as much as approximately ±45 degrees with respect to a horizontal axis of a pin in an open/unlocked position. Interlocking links or link adjustment mechanisms may interlock with one another, and the rotating member of a first interlocking link or link adjustment member may rotate to a closed/locked position. In the closed/locked position, a pin of a second interlocking link or link adjustment member may be fully inserted into the pin aperture provided by the rotating member of the first interlocking link or link adjustment member. The pin may include a pin end that may provide a spring-loaded connector that may be secured in the pin aperture.

17 Claims, 4 Drawing Sheets

LINK ADJUSTMENT MECHANISM

TECHNICAL FIELD

The present disclosure generally relates to link adjustment members for adjustable bands, and more particularly, to removable link adjustment members or removable interlocking links.

BACKGROUND

Generally, bands are known to include removable links in which tools may be required to remove and/or add links. The length of these bands may be adjusted in accordance with the user's preference but may require a skilled user with a steady hand to remove each link. Bands that may provide self-removable links and not require tools may not provide a simple mechanism and/or method of removing links. Based on the foregoing, there is a need for a link adjustment member or removable interlocking links as provided herein.

SUMMARY

Embodiments of the present disclosure generally provide a band that may include a plurality of interlocking links. The plurality of interlocking links may include a first interlocking link that may be removable from a second interlocking link. The first interlocking link may comprise a rotating member that may be provided on a first side of the first interlocking link. A static member may be provided on a second side opposite the first side of the first interlocking link. A pin-locking member may be provided inside the rotating member. A first pin may extend from the static member towards the rotating member. The second interlocking link may provide a pin aperture that may include a hollow channel that may be arranged to slide onto the first pin of the first interlocking link. The pin aperture may be arranged to extend from a first side of the second interlocking link to a second side of the second interlocking link. The second interlocking link may be arranged to interlock with the first interlocking link by rotating the rotating member of the first interlocking link to a closed/locked position. The first pin may be fully inserted into the pin aperture in the closed/locked position. A pin end may be arranged to fit inside the pin-locking member in the closed/locked position. The pin-locking member may provide a shallow aperture that may be sized to receive the pin end and form a snap-fit connection. The pin end may be a spring-loaded connector that may be arranged to retract inside the first pin when the rotating member rotates towards the closed/locked position. The rotating member may rotate up to approximately ±45 degrees with respect to a horizontal axis of the first pin in an open/unlocked position. An indicator may be provided on the rotating member, and the indicator may be provided on a bottom side of the rotating member. The indicator may indicate a direction of rotation of the rotating member. A hinge mechanism may be attached to the rotating member to provide rotation of the rotating member. Additional interlocking links of the plurality of interlocking links may interlock with one another.

A link adjustment mechanism may include a rotating member that may be provided on a first side of the link adjustment mechanism. A static member may be provided on a second side opposite the first side. A pin-locking member may be provided inside the rotating member. A pin may extend from the static member towards the rotating member. A pin aperture may include a hollow channel that may be arranged to slide onto another pin. The link adjustment mechanism may be arranged to interlock with another link adjustment mechanism by rotating the rotating member of the link adjustment mechanism to a closed/locked position. The pin may be fully inserted into a pin aperture of another link adjustment mechanism in the closed/locked position. A pin end may be arranged to fit inside a pin-locking member of another link adjustment mechanism in the closed/locked position. The rotating member may rotate up to approximately ±45 degrees with respect to a horizontal axis of the pin in an open/unlocked position. The pin-locking member may provide a shallow aperture sized to receive a pin end of another link adjustment mechanism and form a snap-fit connection. The pin end may be a spring loaded connector that may be arranged to retract inside a pin of another link adjustment mechanism when the rotating member rotates towards the closed/locked position.

A method may include interlocking a plurality of interlocking links. The method may provide inserting a pin that may include a pin end of a second interlocking link into a pin aperture of a first interlocking link. The method may further include rotating a rotating member of the second interlocking link to a closed/locked position. A pin end of the second interlocking link may be arranged to fit inside of a pin-locking member of the first interlocking link. The pin end of the second interlocking link may be provided on an end of the pin. The method may provide rotating the rotating member of the second interlocking link in a direction of rotation that may be provided by an indicator that may be arranged on a bottom side of the rotating member. The method may include inserting another pin that may include a pin end of a third interlocking link into a pin aperture of the second interlocking link. The method may include rotating a rotating member of the third interlocking link to the closed/locked position. A pin end of the third interlocking link may be arranged to fit inside of a pin-locking member of the second interlocking link. Interlocking additional interlocking links may include inserting additional pins including pin ends into additional pin apertures of the additional interlocking links. The pin ends may fit inside of additional pin-locking members. The method may include rotating additional rotating members of the additional interlocking links to the closed/locked position.

Embodiments of the present disclosure may provide a movable case that may include a first link provided in an interlocking position with both a first pair of tracks and a second pair of tracks. The first link may include first pin and a second pin. Both the first pin and the second pin of the first link may engage a first portion of an interior perimeter of the case, and the first portion of the interior perimeter may be provided proximate the first link. A second link may be provided in the interlocking position with both the first pair of tracks and the second pair of tracks. The second link may provide a first pin and a second pin where both the first pin and the second pin of the second link may engage a second portion of the interior perimeter of the case, and the second portion of the interior perimeter may be provided proximate the second link. The first portion of the interior perimeter of the case may be parallel to the second portion of the interior perimeter of the case. Further, the first portion of the interior perimeter of the case and the second portion of the interior perimeter of the case may be equidistant from a center of the case. The movable case may further comprise a first interior portion provided in a first side of the case, the first interior portion including the first pair of tracks, and a second interior portion provided in a second side of the case, the second interior portion including the second pair of tracks, wherein the first interior portion is parallel to the second interior portion, and the first interior portion and the second interior portion are equidistant from the center of the case. The movable case may further comprise a first position in which both the first link and the second link are provided in the interlocking position. The movable case also may comprise a second position in which the case is rotated approximately 180 degrees with respect to the first position. The first link and the second link may each slidably engage both the first pair of tracks and the second pair of tracks. The first side of the case and the second side of the case may be recessed. The movable case may further comprise a plurality of extension members comprising one of the plurality of extension members interconnected with the first link through a first opening, wherein the case is parallel and proximate the first link and wherein the first link is parallel and proximate the one of the plurality of extension members, and a second one of the plurality of extension members interconnected with the second link through a second opening, wherein the case is parallel and proximate the second link and wherein the second link is parallel and proximate the second one of the plurality of extension members. The case may rotate approximately 360 degrees about both the first link and the second link, and the case may lock with both the first link and the second link with approximately each 180-degree rotation of the case.

The foregoing summary is only intended to provide a brief introduction to selected features that are described in greater detail below in the detailed description. Other technical features may be readily apparent to one skilled in the art from the following drawings, descriptions and claims. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

The present disclosure generally provides a band that may include at least one removable link. The at least one removable link may provide a rotating member that may rotate a maximum of approximately ±45 degrees with respect to a horizontal axis of a pin and/or a horizontal axis of a hinge mechanism. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement.

Figure 1:
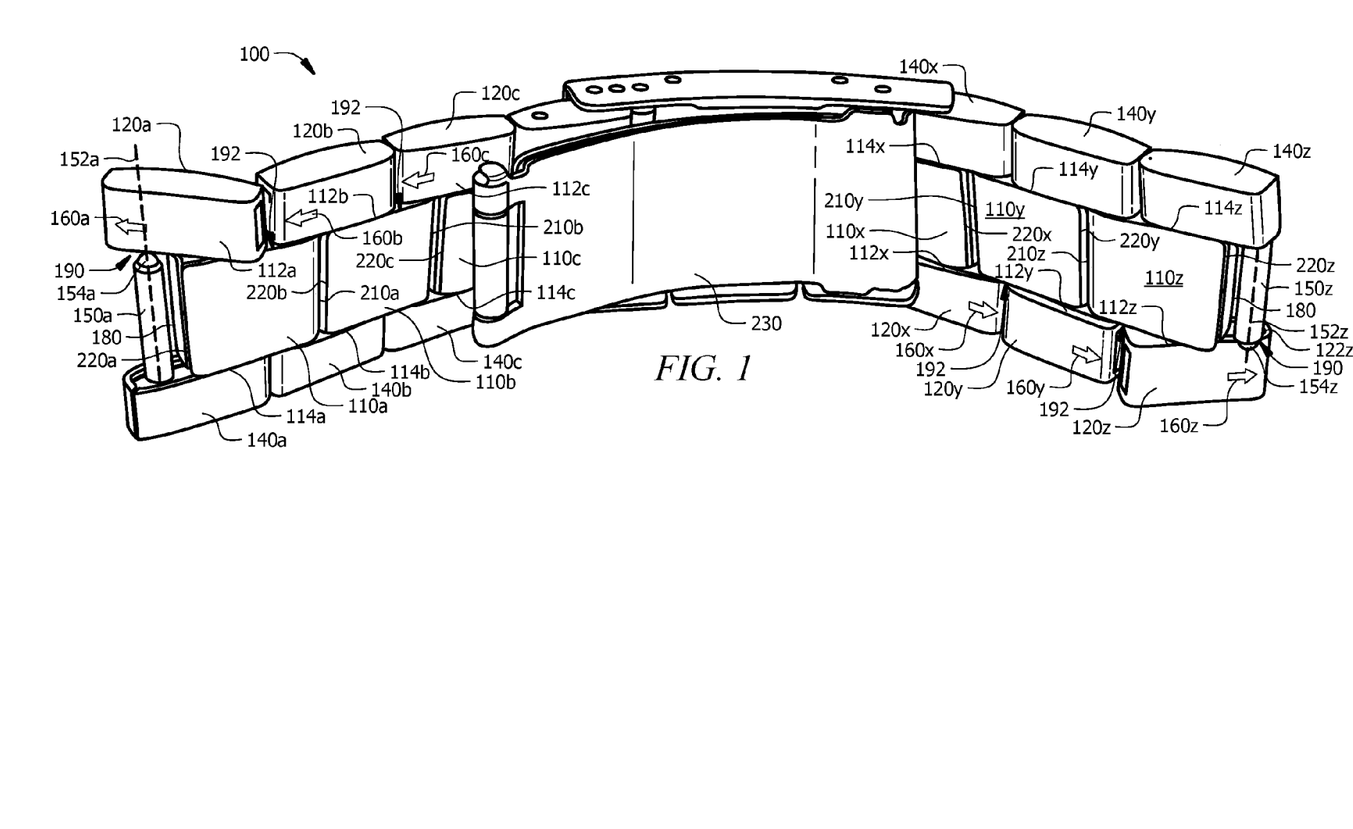
FIG. 1 depicts a perspective view of a band according to an embodiment of the present disclosure.
Figure 3:
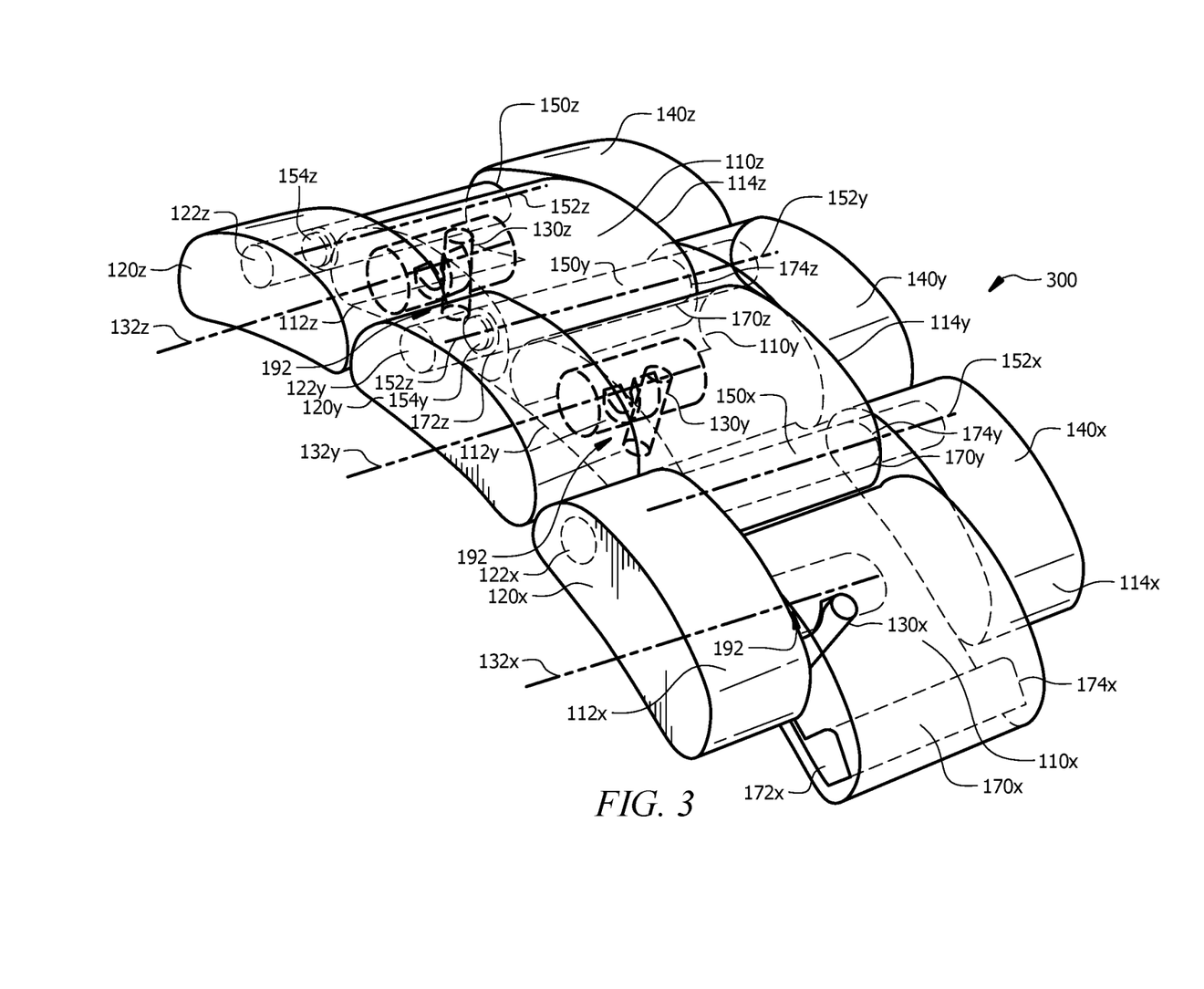
FIG. 3 depicts a sectional view of connected and locked links and a disconnected and unlocked link according to an embodiment of the present disclosure.

FIG. 1 depicts band 100 according to an embodiment of the present disclosure. Band 100 may include at least one removable link 110$a$, 110$b$, 110$c$, 110$x$, 110$y$, and 110$z$. It should be appreciated that any number of interlocking links may be provided in an embodiment of the present disclosure. At least one removable link 110$a$, 110$b$, 110$c$, 110$x$, 110$y$, and 110$z$ may include rotating members 120$a$, 120$b$, 120$c$, 120$x$, 120$y$, and 120$z$, respectively, that may be provided on first sides 112$a$, 112$b$, 112$c$, 112$x$, 112$y$, and 112$z$, respectively, of at least one removable link 110$a$, 110$b$, 110$c$, 110$x$, 110$y$, 110$z$, respectively. Rotating members 120$x$, 120$y$, and 120$z$ may rotate up to approximately ±45 degrees with respect to horizontal axes 152$x$, 152$y$, and 152$z$ (FIG. 3) of pins 150$x$, 150$y$, and 150$z$ (FIG. 3) and/or horizontal axes 132$x$, 132$y$, and 132$z$ (FIG. 3) of hinge mechanisms 130$x$, 130$y$, and 130$z$ (FIG. 3). It should be appreciated that horizontal axis 152$z$ of pin 150$z$ and horizontal axis 132$z$ (FIG. 3) of hinge mechanism 130$z$ (FIG. 3) may be parallel to one another without departing from the present disclosure. It should be appreciated that rotating members 120$a$, 120$b$, 120$c$, 120$x$, 120$y$, and 120$z$ and any additional rotating members may also rotate up to approximately ±45 degrees with respect to a horizontal axis of a respective pin and/or a horizontal axis of a respective hinge mechanism. It should be appreciated that a horizontal axis of each pin and a horizontal axis of each hinge mechanism may be parallel to one another without departing from the present disclosure. Rotating members 120$a$, 120$b$, 120$c$, 120$x$, 120$y$, and 120$z$ may rotate at any angle in some embodiments of the present disclosure. It should be appreciated that if additional rotating members are provided, they may also rotate at any angle without departing from the present disclosure.

Rotating members 120$a$, 120$b$, 120$c$, 120$x$, 120$y$, and 120$z$ may provide indicators 160$a$, 160$b$, 160$c$, 160$x$, 160$y$, and 160$z$, respectively. Indicators 160$a$, 160$b$, 160$c$, 160$x$, 160$y$, and 160$z$ may indicate a direction of rotation of rotating members 120$a$, 120$b$, 120$c$, 120$x$, 120$y$, and 120$z$, respectively. Rotating member 120$z$ may rotate in clockwise or counterclockwise direction 410 (FIG. 4) about horizontal axis 132$z$ (FIG. 3) of hinge mechanism 130$z$ (FIG. 3). Rotating members 120$a$, 120$b$, 120$c$, 120$x$, 120$y$, 120$z$ and any additional rotating members may also rotate in clockwise or counterclockwise direction 410 (FIG. 4) about a respective horizontal axis of a respective hinge mechanism. It should be appreciated that rotating members 120$a$, 120$b$, 120$c$, 120$x$, 120$y$, 120$z$, and any additional rotating members may rotate in any direction without departing from the present disclosure. Indicators 160$a$, 160$b$, 160$c$, 160$x$, 160$y$, and 160$z$ may be provided on a bottom side of band 100 and/or provided at a location on band 100 that may not be seen when band 100 is worn by a user. It should be appreciated that each indicator 160$a$, 160$b$, 160$c$, 160$x$, 160$y$, and 160$z$ may be an arrow, a groove, textured indicator, raised indicator, flat or flush with the surface of each respective rotating member 120$a$, 120$b$, 120$c$, 120$x$, 120$y$, and 120$z$, contain color(s), and/or another type of indicator without departing from the present disclosure. Rotating members 120$a$, 120$b$, 120$c$, 120$x$, 120$y$, and 120$z$ may not include an indicator in some embodiments of the present disclosure. It should be appreciated that additional rotating members may include indicators or may not include indicators in some embodiments of the present disclosure.

It should be appreciated that at least one removable link 110$a$, 110$b$, 110$c$, 110$x$, 110$y$, and 110$z$ may be not removable without departing from the present disclosure. A removable link that may be selected from removable links 110b, 110c, 110x, 110y, and/or 110z may pivot about pin 150a and/or pivot about horizontal axis 152a. Removable links 110a, 110b, 110c, 110x, 110y, and 110z are interchangeable and may be connected to any other link. It should be appreciated that additional removable links may pivot about additional pins and/or pivot about additional horizontal axes without departing from the present disclosure. It should also be appreciated that at least one removable link 110a and 110b (FIG. 4) and 110x, 110y, 110z (FIG. 3), and any additional removable links may each include a pin, and each pin may provide a horizontal axis. It should be appreciated that removable links 110a, 110b, 110c, 110x, 110y, and 110z may be made of any type of material including, but not limited to, a flexible material, stainless steel, and plastic. It should be appreciated that additional removable and/or non-removable links may be made of any type of material without departing from the present disclosure.

Removable links 110c and 110x may be provided on one end or both ends of closure 230, such that closure 230 may form a connection between two removable links. It should be appreciated that closure 230 may connect any two links that may not be removable. For example, as removable links 110a, 110b, 110c, 110x, 110y, and 110z are interchangeable, removable links 110b and 110y may be provided on each end of closure 230 without departing from the present disclosure. It should further be appreciated that closure 230 may connect any two links in which a first link may be removable and a second link may not be removable. It should also be appreciated that closure 230 may secure free ends of band 100 together and may secure band 100 on a user. Closure 230 may be provided in the form of a buckle, hook, elastic band, and/or another type of closure without departing from the present disclosure.

FIG. 1 depicts band 100 that may include at least one removable link 110a, 110b, 110c, 110x, 110y, and 110z that may provide one or more static members 140a, 140b, 140c, 140x, 140y, and 140z, respectively, according to an embodiment of the present disclosure. Static members 140a, 140b, 140c, 140x, 140y, and 140z may be provided on second sides 114a, 114b, 114c, 114x, 114y, and 114z of removable links 110a, 110b, 110c, 110x, 110y, and 110z opposite first sides 112a, 112b, 112c, 112x, 112y, and 112z. Static members 140a and 140z may provide pins 150a and 150z, respectively that may extend horizontally from static members 140a and 140z, respectively, towards rotating members 120a and 120z, respectively. Pin 150a may provide horizontal axis 152a about which another removable link may rotate and/or attach to first removable link 110a. Pin 150b (FIG. 4) of second removable link 110b may provide horizontal axis 152b (FIG. 4) about which removable link 110a may rotate and/or attach to second removable link 110b. Another removable link may attach to first removable link 110a by sliding in a substantially horizontal direction 420 (FIG. 4) onto and/or off of pin 150a of first removable link 110a. Another removable link 110b may rotate about pin aperture 170a (FIG. 4) of first removable link 110a and may form a flexible connection with first removable link 110a. Pins 150a and 150z may be a rod or bar that may engage a pin aperture, and pin ends 154a and 154z may be members that may be shaped to engage pin-locking members. For example, pin end 154a may engage pin-locking member 122z. It should be appreciated that each pin 150b, 150c, 150x, and 150y may also provide a pin end that may be shaped to engage respective pin-locking members without departing from the present disclosure.

It should be appreciated that pin end 154z may provide a shape for mating or fitting inside of pin-locking member 122z of rotating member 120z, such that pin end 154z may provide a male end that may be received by pin-locking member 122z which may provide a female end. It should be appreciated that each pin 150a, 150b, 150c, 150x, 150y, and 150z may also provide a shape for mating or fitting inside of a respective pin-locking member, such that each pin end may provide a male end that may be received by a respective pin-locking member which may provide a female end. Pin end 154z may be arranged to fit inside pin-locking member 122z in closed/locked position 192 (FIGS. 2-3) of rotating member 120z. It should be appreciated that each pin 150a, 150b, 150c, 150x, 150y, and 150z may also be arranged to fit inside a respective pin-locking member 122a (FIG. 4), 122b (FIG. 4), 122c (FIG. 4), 122d (FIG. 4), 122x (FIG. 3), 122y (FIG. 3), and 122z (FIG. 3) in closed/locked position 192 (FIG. 3) of a respective rotating member. Pin end 154z may provide a spring-loaded connector that may be arranged to retract inside of pin 150z when rotating member 120z rotates towards closed/locked position 192 (FIG. 3). It should be appreciated that pin end 154z may extend beyond a length of pin aperture 170z (FIG. 3) to contact and fit inside pin-locking member 122z. It should be appreciated that pins 150a, 150b, 150c, 150x, 150y, and 150z may also provide pin ends, for example, 154a (FIG. 1), 154b (FIG. 4), 154y (FIG. 3), and 154z (FIGS. 1 and 3), respectively (pin ends for 150c and 150x not shown), that may extend beyond a length of respective pin apertures and may contact and fit inside respective pin-locking members.

Figure 4:
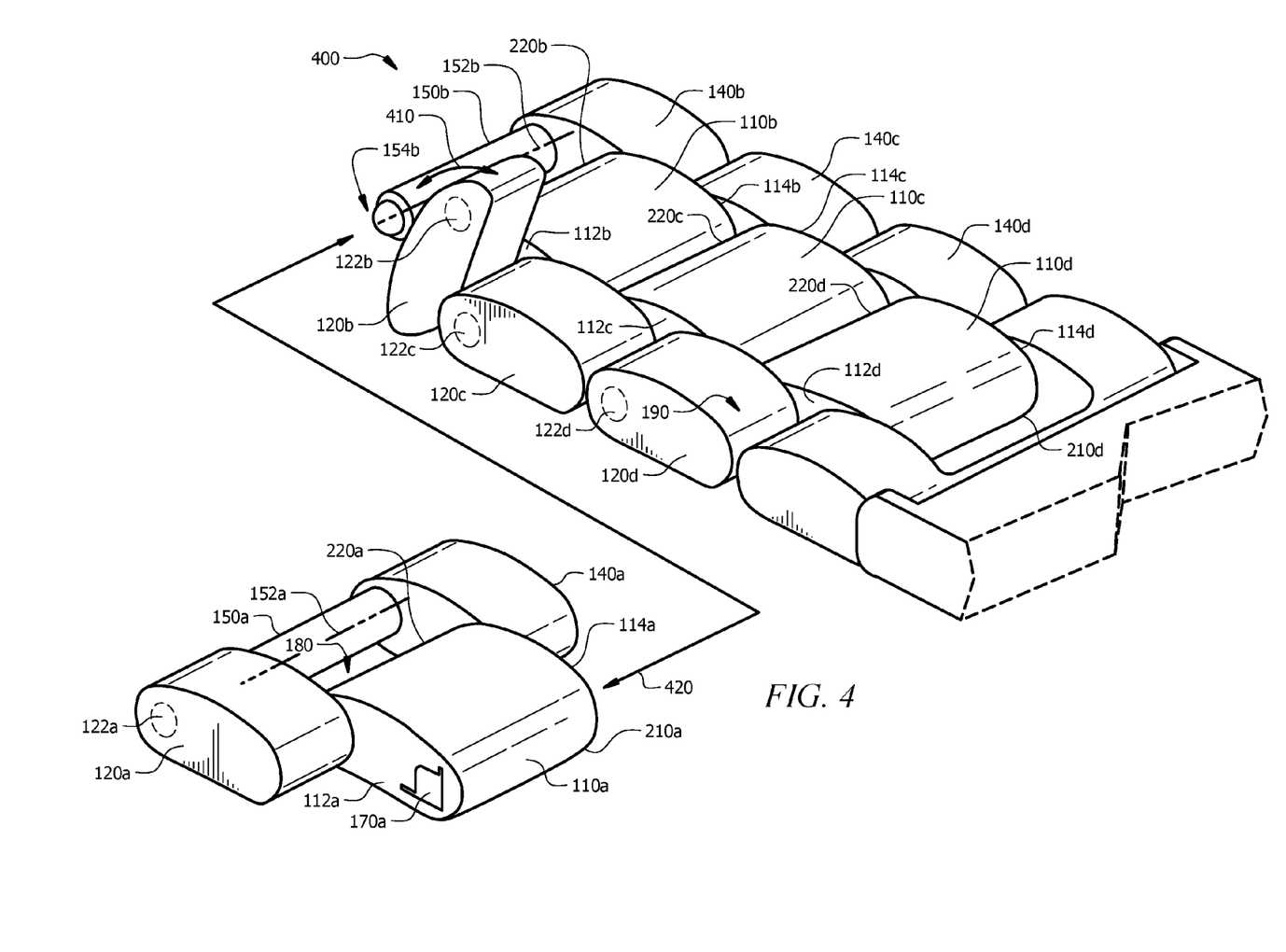
FIG. 4 depicts a perspective view of a band including a link in an unlocked position and links in a locked position according to an embodiment of the present disclosure.

It should be appreciated that pins 150a, 150b, 150c, 150x, 150y, and 150z may be in the form of any shape including, but not limited to, spherical, rectangular, trapezoidal, cylindrical, and other various shapes. Space 180 may be arranged between pin 150a and first end 220a of at least one removable link 110a. Second end 210a of removable link 110a may be arranged proximate first end 210b of removable link 110b. Second end 220c of removable link 110c may be arranged proximate first end 210b of removable link 110b. It should be appreciated that additional removable links may be incorporated into band 100. For example, removable link 110d (FIG. 4) may be arranged proximate removable link 110c, such that a first end (not shown) of removable link 110c may be arranged proximate second end 220d (FIG. 4) of removable link 110d (FIG. 4). Space 180 may also be arranged between pin 150z and first end 220z of at least one removable link 110z. Second end 210a of at least one removable link 110a may provide pin aperture 170a (FIG. 4) that may be configured to receive pin 150b of removable link 110b. Pin 150b may be fully inserted into pin aperture 170z in the closed/locked position. Pin aperture 170a (FIG. 4) may be configured to receive a pin of any removable link without departing from the present disclosure. Pin 150z may disengage from pin-locking member 122z by rotating or unlocking rotating member 120z to open/unlock position 190 in which a space or gap may be provided between pin end 154z and rotating member 120z. Pin 150z may securely engage pin-locking member 122z by rotating or locking at least one rotating member 120z to closed/locked position 192 in which space may not be provided between pin end 154z and rotating member 120z. It should be appreciated that closed/locked position 192 may provide a secure connection between pin end 154z and pin-locking member 122z (FIG. 3).

It should be appreciated that band 100 may provide a plurality of interconnected removable and/or non-removable links without departing from the present disclosure. It should be appreciated that a plurality of rotating members 120a, 120b, and 120c may be aligned laterally on first sides 112a, 112b, and 112c of a plurality of removable links 110a, 110b, and 110c, respectively, and a plurality of rotating members 120x, 120y, and 120z may be aligned laterally on first sides 114a, 114b, and 114c, respectively. It should be appreciated that first sides 112a, 112b, and 112c and first sides 112x, 112y, and 112z may be provided on opposite sides of band 100 so that the plurality of removable links 110a, 110b, 110c, 110x, 110y, and 110z may be interchangeable. A plurality of static members 140a, 140b, and 140c may be aligned laterally on second sides 114a, 114b, and 114c of a plurality of links 110a, 110b, and 110c. A plurality of static members 140x, 140y, and 140z may be aligned laterally on second sides 114x, 114y, and 114z of a plurality of links 110x, 110y, and 110z. It should be appreciated that second sides 114a, 114b, and 114c and second sides 114x, 114y, and 114z may be provided on opposite sides of band 100 so that the plurality of removable links 110a, 110b, 110c, 110x, 110y, and 110z may be interchangeable. It should be appreciated that band 100 may include removable links and/or non-removable links that may not provide rotating members, static members, and/or pins without departing from the present disclosure. It should further be appreciated that removable and/or non-removable links including rotating members, static members, and/or pins may alternate with links that do not include rotating members, static members, and/or pins along a length of band 100.

Figure 2:
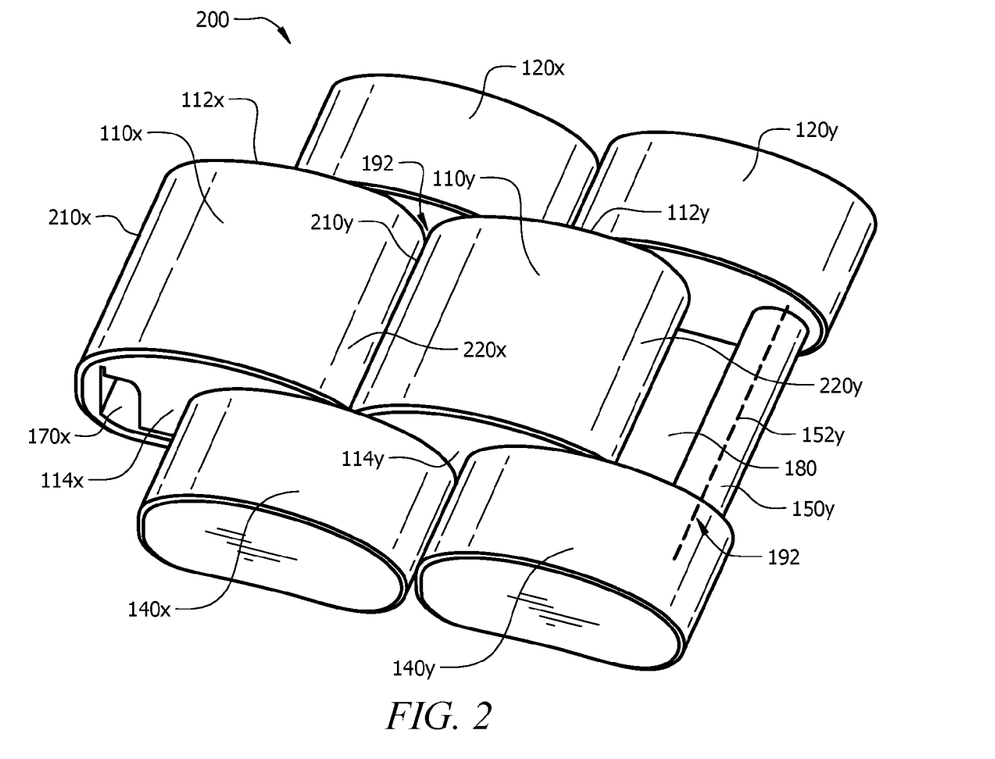
FIG. 2 depicts a perspective view of connected and locked links according to an embodiment of the present disclosure.

FIG. 2 depicts a plurality of closed/locked removable links 200 according to an embodiment of the present disclosure. Removable links 110x and 110y may provide static members 140x and 140y, respectively, on second sides 114x and 114y of removable links 110x and 110y opposite first sides 112x and 112y, respectively. Static member 140y may provide pin 150y that may extend horizontally from static member 140y towards rotating member 120y. Pin 150y may provide horizontal axis 152y about which other removable links may rotate and/or attach to at least one removable link 110y. Pin aperture 170x may form a hollow channel that may receive a pin that may extend from opposite ends 172x (FIG. 3) and 174x (FIG. 3) of pin aperture 170x and may extend from first side 112x to second side 114x or opposite sides of at least one removable link 110x. First end 210x of removable link 110x may provide pin aperture 170x that may receive a pin of any removable link. Second end 220x of removable link 110x may be arranged proximate first end 210y of removable link 110y. Second end 220y of removable link 110y may be arranged proximate pin 150y. It should be appreciated that removable link 110x may be a first link that may be interconnected with removable link 110y which may be a second link.

Pin 150y (FIG. 3) may engage, lock, and/or fasten inside a pin-locking member in closed/locked position 192 in which space may not be provided between pin end 154y (FIG. 3) and rotating member 120y. Pin 150y may disengage from a pin-locking member by rotating or unlocking rotating member 120y to open/unlocked position 190 (FIGS. 1 and 4) in which space may be provided between pin end 154y and rotating member 120y. It should be appreciated that other rotating members may provide pins that may disengage from respective pin-locking members by rotating or unlocking the rotating members to open/unlocked position 190 (FIGS. 1 and 4). For example, pin-locking member 122z (FIG. 1) may provide a shallow aperture in rotating member 120z (FIG. 1) that may form a secure female receiving end for pin end 154z and may be sized to form a snap-fit for pin end 154z (FIG. 1). Space 180 may be arranged between pin 150y and first end 220y of at least one removable link 110y.

FIG. 3 depicts a sectional view of a plurality of closed/locked removable links and unlocked removable link 300 including hinge mechanisms 130x, 130y, and 130z according to an embodiment of the present disclosure. Rotating members 120x, 120y, and 120z may rotate up to approximately ±45 degrees with respect to horizontal axes 152x, 152y, and 152z of pins 150x, 150y, and 150z, respectively, and/or horizontal axes 132x, 132y, and 132z of hinge mechanisms 130x, 130y, and 130z, respectively. It should be appreciated that horizontal axes 152x, 152y, and 152z of pins 150x, 150y, and 150z and horizontal axes 132x, 132y, and 132z of hinge mechanisms 130x, 130y, and 130z, respectively, may be parallel to one another without departing from the present disclosure. Rotating members 120x, 120y, and 120z may rotate at any angle in some embodiments of the present disclosure. Second removable link 110y may rotate about and/or attach to first removable link 110x when pin aperture 170y of second removable link 110y slides in a substantially horizontal direction onto and/or off of pin 150x of first removable link 110x. Pin aperture 170x may form a hollow channel that may extend from opposite ends 172x and 174x of at least one removable link 110x.

At least one removable link 110x, 110y, 110z may provide static members 140x, 140y, and 140z on second sides 114x, 114y, and 114z of removable links 110x, 110y, 110z opposite first sides 112x, 112y, and 112z, respectively. Static members 140x, 140y, and 140z may provide pins 150x, 150y, and 150z, respectively, that may extend horizontally from static members 140x, 140y, and 140z towards rotating members 120x, 120y, and 120z. Pins 150x, 150y, and 150z may provide horizontal axes 152x, 152y, and 152z about which another link may be interchangeable and any link may rotate and/or attach to at least one removable link 110x, 110y, 110z. Pins 150x, 150y, and 150z may be a rod or bar that may engage pin apertures 170x, 170y, and 170z where pin ends 154x, 154y, and 154z may engage a pin-locking member, such as pin end 154z engaging pin-locking member 122z (FIG. 1). It should be appreciated that pin ends 154x, 154y, and 154z may provide a shape for mating or fitting inside of respective pin-locking members, such that pin ends 154x, 154y, and 154z may provide a male end that may be received by pin-locking members which may provide a female member. It should be appreciated that pins 150x, 150y, and 150z may be in the form of any shape including, but not limited to, spherical, rectangular, trapezoidal, cylindrical, and other various shapes. Pin aperture 170x may form a hollow channel that may receive pin 150x and may extend from opposite ends 172x and 174x of pin aperture 170x and may extend from first side 112x to second side 114x of at least one removable link 110x. Second ends 220x, 220y, and 220z (FIGS. 1-2) of first removable links 110x, 110y, and 110z may be arranged proximate first ends 210x, 210y, and 210z (FIGS. 1-2) of second removable links 110x, 110y, and 110z.

Pin 150z may engage, lock, and/or fasten inside pin-locking member 122z (FIG. 1) in closed/locked position 192 in which space may not be provided between pin end 154z and rotating member 120z. Pin 150z may disengage from pin-locking member 122z (FIG. 1) by rotating or unlocking rotating member 120z to open/unlocked position 190 (FIGS. 1 and 4) in which space may be provided between pin end 154z and rotating member 120z. Pin-locking member 122z (FIG. 1) may provide a shallow aperture in rotating member 120z that may form a secure female receiving end for pin end 154z.

FIG. 4 depicts a perspective view of band 400 including removable link 110b in open/unlocked position 190 and additional links 110a, 110c, and 110d in closed/locked position 192 according to an embodiment of the present disclosure. Removable links 110a, 110b, 110c, and 110d may include rotating members 120a, 120b, 120c, and 120d that may be provided on first sides 112a, 112b, 112c, and 112d of removable links 110a, 110b, 110c, and 110d. Rotating members 120a, 120b, 120c, and 120d may rotate up to approximately ±45 degrees with respect to horizontal axes 152a and 152b of pins 150a and 150b, respectively, and/or horizontal axes of hinge mechanisms, such as 132x, 132y, and 132z (FIG. 3) of rotating members 120x, 120y, and 120z (FIGS. 2-3). It should be appreciated that horizontal axes 152a and 152b of pins 150a and 150b and horizontal axes of corresponding hinge mechanisms (not shown) may be parallel to one another without departing from the present disclosure.

Rotating members 120a, 120b, 120c, and 120d may rotate at any angle in some embodiments of the present disclosure. Rotating members 120a, 120b, 120c, and 120d may rotate in clockwise or counterclockwise direction 410 about horizontal axes of hinge mechanisms (not shown), similar to horizontal axes 132x, 132y, and 132z (FIG. 3) of hinge mechanisms 130x, 130y, and 130z (FIG. 3). It should be appreciated that rotating members may rotate in any direction without departing from the present disclosure. It should be appreciated that at least one removable link 110a, 110b, 110c, and 110d may be not removable without departing from the present disclosure. At least one removable link 110a, 110b, 110c, and 110d may pivot about pins 150a and 150b and/or pivot about horizontal axes 152a and 152b. It should be appreciated that at least one removable link 110a, 110b, 110c, and 110d may be made of any type of material including, but not limited to, a flexible material, stainless steel, and plastic.

At least one removable link 110a, 110b, 110c, 110d, and 110e may be provided on one end or both ends of closure 230 (FIG. 1), such that closure 230 may form a connection between two removable links. It should be appreciated that closure 230 (FIG. 1) may connect two links that may not be removable. It should further be appreciated that closure 230 (FIG. 1) may connect two links in which a first link may be removable and a second link may not be removable. It should also be appreciated that closure 230 (FIG. 1) may secure free ends of band 400 together and may secure band 400 on a user. Closure 230 (FIG. 1) may be provided in the form of a buckle, hook, elastic band, and/or another type of closure without departing from the present disclosure.

FIG. 4 depicts a perspective view of band 400 including at least one removable link 110a, 110b, 110c, and 110d that may provide static members 140a, 140b, 140c, and 140d on second sides 114a, 114b, 114c, and 114d of at least one removable link 110a, 110b, 110c, and 110d opposite first sides 112a, 112b, 112c, and 112d according to an embodiment of the present disclosure. Static members 140a and 140b may provide pins 150a and 150b that may extend horizontally from static members 140a and 140b towards rotating members 120a and 120b. Pins 150a and 150b may provide horizontal axes 152a and 152b about which another link may rotate and/or attach to at least one removable link 110a, 110b, 110c, and 110d. Second removable link 110b may rotate about and/or attach to first removable link 110a when pin aperture 170b of second removable link 110b slides in a substantially horizontal direction 410 onto and/or off of pin 150a of first removable link 110a. Pin aperture 170b may form a hollow channel that may receive pin 150a.

Second end 220a of first removable link 110a may be proximate first end 210b (FIG. 1) of second removable link 110b. Second end 220b of second removable link 110b may be proximate pin 150b and/or first end 210a of first removable link 110a. Second end 220c of third removable link 110c may be proximate second removable link 110b. Second end 220d of fourth removable link 110d may be proximate third removable link 110c. First end 210d of fourth removable link 110d may be proximate another removable and/or non-removable link. Pins 150a and 150b may engage, lock, and/or fasten inside a pin-locking member, such as pin-locking member 122 (FIG. 1), in closed/locked position 192 in which space may not be provided between pin end 154a and rotating member 120a. Pin 150z may disengage from pin-locking member 122z (FIG. 1) by rotating or unlocking rotating member 120z to open/unlocked position 190 in which space may be provided between pin end 154z and rotating member 120z. Space 180 may be arranged between pin 150a and first end 220a of at least one removable link 110a. First removable link 110a may rotate about and/or attach to second removable link 110b when pin aperture 170a of first removable link 110a slides in a substantially horizontal direction 420 onto and/or off of pin 150b of second removable link 110b.

Any number of link adjustment members may be provided. It should be appreciated that link adjustment members may be provided in any order and/or position along the band in embodiments of the present disclosure. For example, link adjustments members may be provided on both sides of a closure without departing from the present disclosure. It should be appreciated that a pin may be spring-loaded or movable without departing from the present disclosure. The pin may be secured in a pin aperture when a rotating member is rotated in a clockwise and/or counterclockwise direction in embodiments of the present disclosure.

It should be appreciated that the band according to embodiments of the present disclosure may assume any desired length without departing from the present disclosure. It should further be appreciated that the band may incorporate any material(s) including, not limited to, metal, plastic, and/or leather. It should further be appreciated that there may be embodiments of the present disclosure wherein the band may assume the form of a watch, a bracelet, a belt, a keychain and/or any other accessory without departing from the present disclosure. It should be appreciated that different colors, textures, and/or designs may be provided on each side of the band without departing from the present disclosure.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A band, comprising:
a plurality of interlocking links, wherein a first interlocking link is removable from a second interlocking link; the first interlocking link, comprising:
a rotating member provided on a first side of the first interlocking link;
a static member provided on a second side opposite the first side of the first interlocking link;
a pin-locking member provided inside the rotating member; and
a first pin extending from the static member, wherein the first pin extends towards the rotating member; and
the second interlocking link, comprising:
a pin aperture including a hollow channel arranged to slide onto the first pin of the first interlocking link, wherein the pin aperture is arranged to extend from a first side of the second interlocking link to a second side of the second interlocking link.

2. The band of claim 1, wherein the second interlocking link is arranged to interlock with the first interlocking link, and wherein the rotating member of the first interlocking link rotates to a closed/locked position.

3. The band of claim 2 further comprising:
a pin end arranged to fit inside the pin-locking member, wherein the closed/locked position is formed.

4. The band of claim 3, wherein the pin-locking member provides a shallow aperture, wherein the aperture is sized to receive the pin end, and wherein the pin end and the pin-locking member form a snap-fit connection.

5. The band of claim 3, wherein the pin end is a arranged to retract inside the first pin, and wherein the rotating member rotates towards the closed/locked position.

6. The band of claim 1, wherein the rotating member is provided to rotate up to approximately ±45 degrees with respect to a horizontal axis of the first pin, and wherein an open/unlocked position is formed.

7. The band of claim 1 further comprising:
an indicator provided on the rotating member,
wherein the indicator is provided on a bottom side of the rotating member, and
wherein the indicator is provided to indicate a direction of rotation of the rotating member.

8. The band of claim 1, wherein additional interlocking links of the plurality of interlocking links are arranged to interlock with one another.

9. A link adjustment mechanism, comprising:
a rotating member provided on a first side;
a static member provided on a second side opposite the first side;
a pin-locking member provided inside the rotating member;
a first pin extending from the static member, wherein the first pin extends towards the rotating member; and
a pin aperture including a hollow channel arranged to slide onto a second pin.

10. The link adjustment mechanism of claim 9, wherein the link adjustment mechanism is arranged to interlock with a second link adjustment mechanism, and wherein the rotating member rotates to a closed/locked position.

11. The link adjustment mechanism of claim 10 further comprising:
a pin end arranged to fit inside a pin-locking member of the second link adjustment mechanism, wherein the closed/locked position is formed.

12. The link adjustment mechanism of claim 9, wherein the rotating member is arranged to rotate up to approximately ±45 degrees with respect to a horizontal axis of the first pin, and wherein an open/unlocked position is formed.

13. The link adjustment mechanism of claim 9, wherein the pin-locking member provides a shallow aperture, wherein the aperture is sized to receive a pin end of a second link adjustment mechanism, and wherein the pin end and the pin-locking member form a snap-fit connection.

14. The link adjustment mechanism of claim 13, wherein the pin end is arranged to retract inside a pin of the second link adjustment mechanism, and wherein the rotating member rotates towards the closed/locked position.

15. A method of interlocking a plurality of interlocking links, comprising:
inserting a pin of a second interlocking link into a pin aperture of a first interlocking link; and
rotating a rotating member of the second interlocking link to a closed/locked position, wherein a pin end of the second interlocking link is arranged to fit inside of a pin-locking member of the first interlocking link, and wherein the pin end of the second interlocking link is provided on an end of the pin.

16. The method of claim 15 further comprising:
rotating the rotating member of the second interlocking link in a direction of rotation, wherein an indicator is arranged on a bottom side of the rotating member and provides the direction of rotation.

17. The method of claim 15 further comprising:
inserting a pin of a third interlocking link into a pin aperture of the second interlocking link;
rotating a rotating member of the third interlocking link to the closed/locked position, wherein a pin end of the third interlocking link is arranged to fit inside of a pin-locking member of the second interlocking link;
interlocking additional interlocking links into additional pin apertures of the additional interlocking links, wherein the additional pins include pin ends, and wherein the pin ends fit inside of additional pin-locking members; and
rotating additional rotating members of the additional interlocking links to the closed/locked position.

* * * * *